United States Patent [19]

Nordstrom

[11] 4,159,667
[45] Jul. 3, 1979

[54] TORQUE LIMITING RF CONNECTOR

[75] Inventor: Donald B. Nordstrom, Stuart, Fla.

[73] Assignee: Solitron Devices, Inc., Tappan, N.Y.

[21] Appl. No.: 822,602

[22] Filed: Aug. 8, 1977

[51] Int. Cl.² ............................................. F16B 31/02
[52] U.S. Cl. .......................................... 85/61; 85/32.1;
                                                 174/35 C; 339/143 R
[58] Field of Search ........................... 85/32.1, 61, 63;
        151/10, 11, 19 A, 69; 174/35 C; 339/143 R, 143
                                                      C, 143 T

[56] References Cited

U.S. PATENT DOCUMENTS

| 3,667,339 | 6/1972 | Dame | 85/61 |
| 4,046,052 | 9/1977 | Nordstrom | 85/61 |

Primary Examiner—James C. Mitchell
Attorney, Agent, or Firm—Richard G. Geib

[57] ABSTRACT

A connecting nut having a base ring supporting a torque ring in a groove in the body of the base ring and a hex ring held about the torque ring by an annular flange in another groove of the base ring to permit rotation of the hex ring relative to the base ring when the frictional contact between the torque ring and the hex ring is exceeded.

2 Claims, 5 Drawing Figures

TORQUE LIMITING RF CONNECTOR

BACKGROUND

The invention relates to connectors for use as RF connectors whereby insulated contacts can be joined without excessive forces that could degrade electrical performance by means that will, in the connector, provide for uniform tightening of the connection such as shown by copending patent application Ser. No. 732,203 filed Oct. 14, 1976 and now U.S. Pat. No. 4,046,052 assigned to the common assignee of this invention.

SUMMARY OF INVENTION

The present invention is an improvement to the copending patent application aforesaid in providing means to unite the elements of a torque limiting couple without interferring with the torque limiting features of such.

DRAWING DESCRIPTION

DETAILED DESCRIPTION

Figure 1:
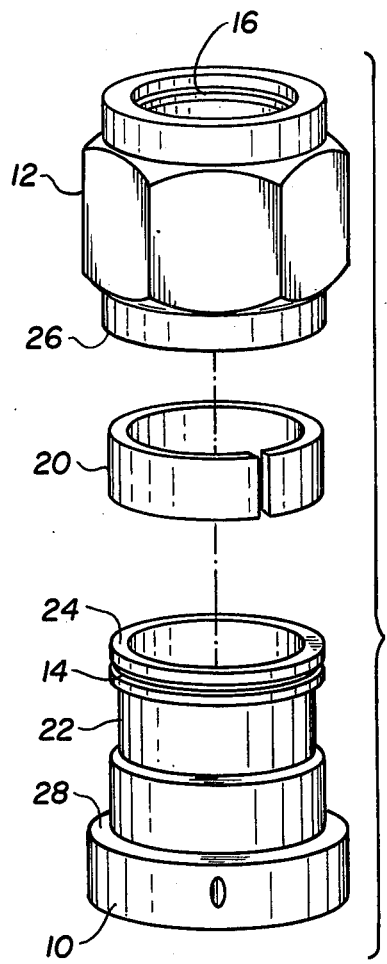
FIG. 1 is an exploded view of the basic elements of a preferred form of this invention.

With more particular reference to FIG. 1 there it is shown by means of an exploded view the coupler elements of this invention in a preferred form. Specifically a base ring 10 is bored to receive a cable body (not shown). A groove 14 in base ring 10 with annular flange 16 in hex ring 12 will when the hex ring is placed over the base ring, hold base ring 10 rotatably free within the hex ring.

A tension ring 20 is fitted in recess 22 of base ring 10 such that it will in a free state be slightly larger in diameter than the end 24 of base ring 10. Upon compression of tension ring 20, and shrinking of end 24, as will be later discussed, the hex ring 12 is placed over tension ring 20 on base ring 10 until shoulder 26 is abutting flange 28 of base ring 10. At such position the flange 16 is located opposite groove 14.

Assuming base ring 10 to be cool and hex ring 12 to be warm, the flange 16 will flow into groove 14 as these parts warm up to and cool down to, respectively, room temperature. Thereafter, a coaxial cable is coupled to the cable body by threading a nut on a threaded end of the cable body. (See copending patent application Ser. No. 732,203 filed Oct. 14, 1976 and now U.S. Pat. No. 4,046,052.)

Figure 4:
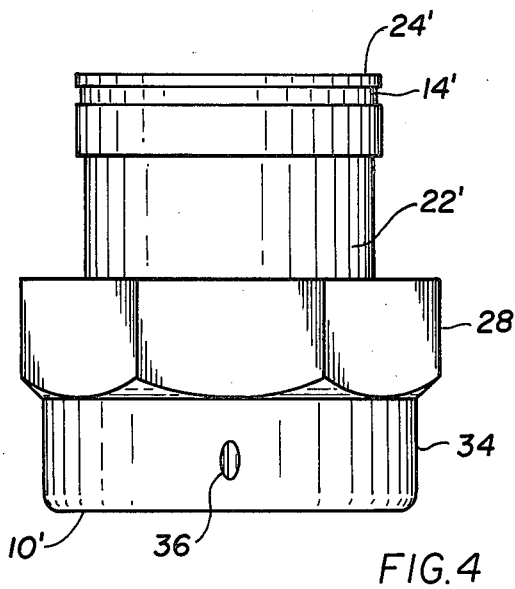
FIG. 4 is a side view of an alternate form for the base ring useable with the alternate form of hex ring of FIG. 2 in accordance with this invention.
Figure 2:
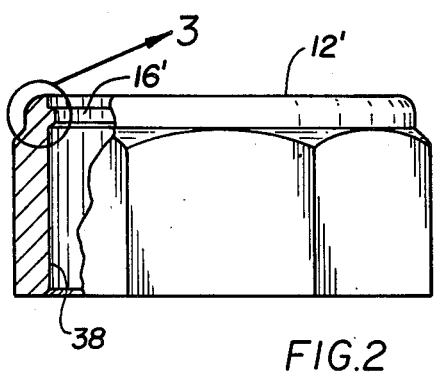
FIG. 2 is a partial cross-sectional view of an alternate form for the hex ring element according to this invention.

The main elements of this invention may take another form, as shown by FIGS. 2 and 4. There the main differences are a base ring 10' (See FIG. 4.) which is provided with a hex portion 28.

Figure 3:
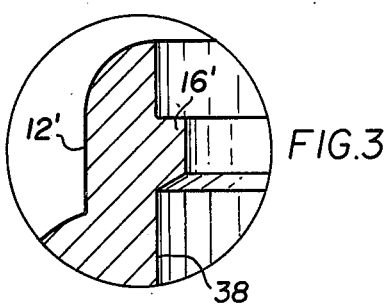
FIG. 3 is an enlarged detail of a portion of the hex ring of FIG. 2.

FIG. 2 shows a partially cross-sectioned side view of a nut (hex ring) 12'. It is used with the alternate base ring 10' shown by FIG. 4. The annular flange 16' is best shown by the enlarged detail illustration of FIG. 3.

As for the structures of FIGS. 1 and 2 assuming a concentric groove diameter of 0.480 one may better appreciate this invention by noting that body end 24 is dimensioned to 0.525±0.001 inches and the inside diameter of nuts 12' is 0.530±0.001 inches with a surface between under the flange 16' of 0.537±0.001 inches. With parts such as the above typical base ring and hex ring the tension ring has an outside diameter of 0.535+0.000−0.002 inches and an inside diameter of 0.483±0.001 inches and a height of 0.30+0.001 inches with a slot between ends of (0.030/0.040) inches.

Completing the construction is the drilling of end 34 to provide for wire lock means as at 36 when required by specification in some uses of the coupling nut of this invention.

Copending patent application Ser. No. 732,203 filed Oct. 14, 1976, now U.s. Pat. No. 4,046,052 shows various forms of tension rings which have been found to have utility with the coupling nuts.

With the use of a solid ring 20 the assembly would be to subject the base ring 10 to freezing temperature to cool same and contract its external diameter to receive tension ring 20 over its end into the area of groove 22. The hex ring 12 is heated to an elevated temperature to expand its internal diameter to assemble it over the tension ring 20 with flange 16 aligned with groove 14. Holding this alignment the base ring warms to and the hex ring cools to room temperature whereupon the tension ring 20 is compressed between the hex ring and base ring and flange 16 extends into groove 14 to maintain the assembly.

As for the materials the standard is brass for the base ring and hex ring. As for the tension ring it has been found that various materials can be used to give predictable torque values for the coupling nut assembly. For example, with a Bakelite tension ring the nut is good for assemblies that require 32–60 in/lbs., with a stainless steel tension ring the nut is good for assemblies requiring 15–30 in/lbs., and with a Nylon tension ring the nut is good for assemblies limited to torque from 0 to 20 in/lbs. in assembly. In essence, in this invention the annular flange 16 in the groove 14 will enable shelf storing of the torque limiting coupler without fear of inadvertent separation and improper field assembly. This will enable a more controlled inventory to be shelved.

When tension ring 20 has been located about the groove 22 after the base ring 10 is cooled as aforedescribed, hex ring 12 is heated to a temperature below any critical temperature of ring 20. This will expand the hex ring 12 so that it may freely be assembled over the cooled (contracted) ring 10 until flange 16 and groove 14 are opposite each other. The base ring and hex ring are then allowed to return to room temperature whereupon base ring 10 expands and hex ring 12 contracts to their normal external and internal, respectively, diameters. This will locate flange 16 loosely within groove 14 with the hex ring 12 and base ring 10 being connected such that they may rotate with respect to each other subject to the frictional connection by the tension ring 20.

A method of such assembly with tooling is shown by the copending patent application aforesaid.

Figure 5:
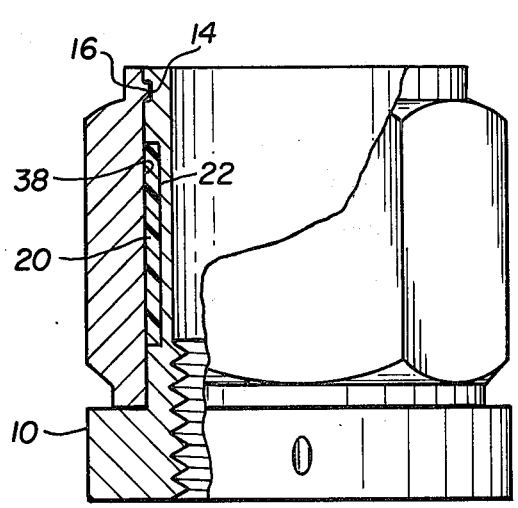
FIG. 5 is a partial cross-sectional view of the structure of this invention in a preferred assembly.

FIG. 5 shows such completed assembly where tension ring 20 fills groove 22 of base ring 10 compressed against wall 38 of hex ring 12 and flange 16 is in groove 14. Having described several structures, not as a limitation on the objects of this invention but as presently known forms it may take, their utility of operation and a manner of assembly that will permit same, it is now desired to set forth the claims for these Letters Patent, as follows.

I claim:
1. A coupling nut comprising:
   a base ring that is adapted to receive a member to be coupled by the nut, said base ring having internal threads at one end for the coupling of the nut, a shoulder at the one end and an elongated body above said shoulder, said elongated body having first and second grooved areas in said body;
   a tension ring rotatably supported within said first grooved area in said base ring, said tension ring having a cross sectional thickness such that it presents an external diameter from within said first grooved area greater than the external diameter of said elongated body but less than the external diameter of said shoulder; and
   a hex ring having an internal bore that permits it to be assembled about said tension ring to said base ring, said bore of a diameter that on assembly is less than the external diameter of the tension ring to compress said tension ring between the hex ring and the base ring providing a frictional connection of said base ring and said hex ring, said frictional connection being torque limiting whereby said hex ring may be wrenched to bidirectionally drive said base ring via said tension ring to effect a coupling of the nut, said hex ring being free to rotate relative to the tension ring and base ring when torqued in excess of the forces of the frictional contact of said tension ring between said base ring and hex ring, said hex ring having a projecting flange located within said second grooved area of said base ring when assembled to said base ring, said projecting flange and said second grooved area connecting said hex ring to said base ring while allowing said hex ring to rotate when torqued in excess of the forces of the frictional connection in relation to said base ring.

2. An RF coupling nut comprising:
   a base ring having a body with means internally to permit coupling with another RF element, said body having externally adjacent one end a shoulder having a hexagonal surface, a first groove adjacent and above said hexagonal shoulder and a second groove above said first groove;
   a tension ring rotatably supported in and located by the first groove when said tension ring is assembled to said base ring, said tension ring being of a cross sectional thickness that in its free state as assembled to said base ring said tension ring has an external diameter greater than the body of the base ring so as to project from within said first groove beyond the body of said base ring; and
   a hex ring assembled about the body of said base ring, said hex ring having a projection internally thereof cooperating with said second groove in said body to connect the hex ring and the base ring, said hex ring, when connected to said base ring, having an internal wall in contact with the tension ring, said wall being of a lesser internal diameter than said external diameter of the tension ring to compress said tension ring between said hex ring and said base ring providing a frictional connection that is a torque limiting driving connection between the hex ring and the base ring so long as the hex ring only is wrenched for coupling of the nut to other structure.

* * * * *